2,885,403
N-(TRIMETHYL-PIPERIDYL) CARBOXANILIDES

David J. Beaver, Richmond Heights, and Paul J. Stoffel, St. Louis, Mo., assignors to Monsanto Chemical Company, St. Louis, Mo., a corporation of Delaware No Drawing. Application November 2, 1956
Serial No. 619,937

6 Claims. (Cl. 260—294)

This invention relates to new and useful compounds, specifically N-(trimethyl-piperidyl) carboxanilides of the structure

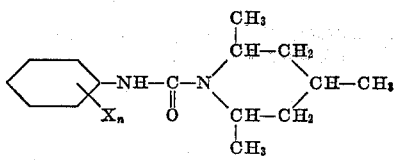

wherein X is chlorine or bromine, $n$ is a whole number from 2 to 3, and the phenyl radical is free of substituents ortho to the nitrogen atom.

As illustrative of the carboxanilides of this invention is the following:

N-(2,4,6-trimethyl-piperidyl) 3,4-dichloro-carboxanilide
N-(2,4,6-trimethyl-piperidyl) 3,5-dichloro-carboxanilide
N-(2,4,6-trimethyl-piperidyl) 3,4-dibromo-carboxanilide
N - (2,4,6 - trimethyl - piperidyl) 3,4,5 - trichloro - carboxanilide
N - (2,4,6 - trimethyl - piperidyl) 3,4,5 - tribromo - carboxanilide These new compounds are prepared by reacting 2,4,6-trimethyl-piperidine with an isocyanate of the formula

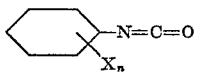

in the presence of an inert organic solvent. As illustrative of the preparation of the carboxanilides of this invention is the following:

Example I

To a suitable reaction vessel is charged and intimately mixed at room temperature 9.4 parts by weight of 3,4-dichlorophenylisocyanate, 6.4 parts by weight of 2,4,6-trimethyl-piperidine, and 40 parts by weight of diethyl ether. The mass is agitated for about one hour at room temperature and then filtered. The filter cake is washed twice with heptane and dried. The white solid so obtained is N-(2,4,6-trimethyl-piperidyl) 3,4-dichloro-carboxanilide, which melts at 135.3–136.1° C.

Example II

Employing the procedure of Example I but replacing 3,4-dichlorophenylisocyanate with an equal weight of 3,5-dichlorophenylisocyanate, there is obtained N-(2,4,6-trimethyl-piperidyl) 3,5-dichloro-carboxanilide.

Example III

Employing the procedure of Example I but replacing 3,4-dichlorophenylisocyanate with a chemically equivalent weight of 3,4,5-trichlorophenylisocyanate, there is obtained N-(2,4,6-trimethyl-piperidyl) 3,4,5-trichloro-carboxanilide.

Example IV

Employing the procedure of Example I but replacing 3,4-dichlorophenylisocyanate with a chemically equivalent weight of 3,4-dibromophenylisocyanate, there is obtained N - (2,4,6 - trimethyl - piperidyl) 3,4 - dibromo-carboxanilide.

In the preparation of the new compounds of this invention other inert solvents than diethyl ether may be employed, e.g. di-isopropyl ether, methylbutyl ether, the liquid alkanes, and the like. The reaction temperature employed in preparing the new compounds will depend upon the particular reactants and in general will be between room temperature and the reflux temperature of the system.

The compounds of this invention are particularly useful in controlling bacterial growth, particularly *Micrococcus pyogenes* var. *aureus*. In this regard the carboxanilides when compounded with a detergent soap (i.e. an alkali metal salt of a higher fatty acid of animal or vegetable origin, such as stearic acid, lauric acid, palmitic acid, oleic acid, linoleic acid, ricinoleic acid, and the like, or mixtures thereof obtained from tallow, lard, cocoanut oil, palm oil, castor oil, olive oil, cottonseed oil, and the like) provide highly useful antiseptic detergent soap compositions.

In order to illustrate the activity of the carboxanilides of this invention N-(2,4,6-trimethyl-piperidyl) 3,4-dichloro-carboxanilide was incorporated in an alkali metal fatty acid soap [specifically a mixture of alkali metal salts of fatty acids whose fatty acid content analyzes

| | Percent |
|---|---|
| Oleic and linoleic acid | About 46 |
| Stearic acid | About 14 |
| Palmitic acid | About 30 |
| Lower fatty acids (myristic, lauric, etc.) | About 10] | in a weight ratio of one part to 50 parts soap. Aliquots were added to a Sabourard's dextrose agar medium so as to give concentrations in parts per million as set forth below. The agar in each case was then poured into a petri dish, allowed to harden and then inoculated with a standard culture of *Micrococcus pyogenes* var. *aureus* of standard resistance. The incubation in each instance was made at 37° C. for 48 hours. The extent of growth is noted below:

| Compound/Concentration, p.p.m. | 1,000 | 100 | 10 |
|---|---|---|---|
| N - (2,4,6 - trimethyl - piperidyl) 3,4 - dichloro-carboxanilide | none | none | none |

The same control of *Micrococcus pyogenes* var. *aureus* is obtained by replacing N-(2,4,6-trimethyl-piperidyl) 3,4-dichloro-carboxanilide in the foregoing detergent soap composition with an equal weight of N-(2,4,6-trimethyl-piperidyl) 3,5-dichloro-carboxanilide, N-(2,4,6-trimethyl-piperidyl) 3,4,5-trichloro-carboxanilide, and N-(2,4,6-trimethyl-piperidyl) 3,4-dibromo-carboxanilide.

Relatively small amounts of these carboxanilides in a detergent soap composition have been found to yield effective antiseptic detergent soap compositions. Amounts as low as 0.5 to 1% by weight based on the weight of the detergent soap have proved satisfactory. However, it is preferred to employ these carboxanilides in amounts in the order of 1 to 5% by weight based on the detergent soap. While larger amounts, as for example up to 10% by weight, may be employed the upper limit will be determined by practical considerations. Various colors, antioxidants, perfumes, water softeners, emollients, and the like, may be included where desirable in detergent compositions containing these new carboxanilides. The term "soap" or "detergent soap" as used herein is employed in its popular or ordinary meaning, i.e. those cleansing compositions prepared from an alkali metal compound such as potassium or sodium hydroxide and a fat or fatty acid, both saturated and unsaturated.

While this invention has been described with respect to certain embodiments, it is not so limited and it is to be understood that variations and modifications thereof obvious to those skilled in the art may be made without departing from the spirit or scope of this invention.

What is claimed is:
1. N - (2,4,6 - trimethyl - piperidyl) 3,4 - dichlorocarboxanilide.
2. N - (2,4,6 - trimethyl - piperidyl) 3,5 - dichlorocarboxanilide.
3. Compounds of the structure

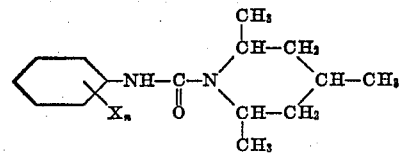

wherein the phenyl radical is free of substituents ortho to the nitrogen atom, wherein X is a member selected from the class consisting of chlorine and bromine and wherein $n$ is a whole number from 2 to 3.
4. Compounds of claim 3 wherein X is chlorine and $n$ is two.
5. The process of making N-(2,4,6-trimethyl piperidyl) polyhalocarboxanilides which comprises reacting 2,4,6-trimethyl-piperidine with an isocyanate free of ortho substituents of the structure

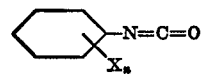

wherein X is a member selected from the class consisting of chlorine and bromine and $n$ is a whole number from 2 to 3 in substantially equimolecular proportions in the presence of an inert solvent at a temperature ranging between room temperature and the reflux temperature of the system.
6. The process of making N-(2,4,6-trimethyl-piperidyl) 3,4-dichlorocarboxanilide which comprises reacting 2,4,6-trimethyl-piperidine with a 3,4-dichlorophenyl-isocyanate in the presence of an inert organic solvent at a temperature ranging between room temperature and the reflux temperature of the system.

References Cited in the file of this patent
UNITED STATES PATENTS
2,775,587     Fischback et al _____ Dec. 25, 1956

OTHER REFERENCES
Henry: Am. Chem. Soc., vol. 71 (1949), pp. 2297–2300.
Bouchetal: Soc. Chem. of Paris Bul., 3rd series, vol. 31 (1904), pp. 21–23.
Chem. Abstracts, vol. 48 (1954), p. 2709 (Abstract of Hancox: Australian J. Chem.).